United States Patent
Kim et al.

(10) Patent No.: US 9,496,718 B2
(45) Date of Patent: Nov. 15, 2016

(54) WIRELESS POWER TRANSMISSION SYSTEM, AND METHOD OF CONTROLLING RESONANCE IMPEDANCE AND RESONANCE FREQUENCY OF WIRELESS POWER TRANSMISSION SYSTEM

(75) Inventors: Nam Yun Kim, Seoul (KR); Sang Wook Kwon, Seongnam-si (KR); Yun Kwon Park, Dongducheon-si (KR); Chang Wook Yoon, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1010 days.

(21) Appl. No.: 13/463,860

(22) Filed: May 4, 2012

(65) Prior Publication Data

US 2012/0286582 A1 Nov. 15, 2012

(30) Foreign Application Priority Data

May 11, 2011 (KR) .................. 10-2011-0044043

(51) Int. Cl.
*H01F 27/42* (2006.01)
*H02J 5/00* (2016.01)

(52) U.S. Cl.
CPC ................................ *H02J 5/005* (2013.01)

(58) Field of Classification Search
CPC ....... H02J 5/00; H02J 17/00; A61N 1/37223
USPC ...................................................... 307/104
See application file for complete search history.

(56) References Cited

U.S. PATENT DOCUMENTS

| 2009/0015075 | A1 | 1/2009 | Cook et al. |
| 2009/0271047 | A1* | 10/2009 | Wakamatsu ............ H02J 5/005 700/295 |
| 2010/0070219 | A1* | 3/2010 | Azancot ................. H02J 5/005 702/62 |
| 2010/0109445 | A1* | 5/2010 | Kurs ..................... B60L 11/007 307/104 |
| 2010/0171368 | A1 | 7/2010 | Schatz et al. |
| 2010/0244582 | A1* | 9/2010 | Yoshikawa .................. 307/104 |
| 2010/0259109 | A1 | 10/2010 | Sato |
| 2012/0001485 | A1* | 1/2012 | Uchida ........................ 307/11 |
| 2012/0223588 | A1* | 9/2012 | Suzuki ........................ 307/104 |

FOREIGN PATENT DOCUMENTS

| JP | 2009-261104 | 11/2009 |
| JP | 2010-119684 | 6/2010 |
| JP | 2010-130878 | 6/2010 |

(Continued)

*Primary Examiner* — Jared Fureman
*Assistant Examiner* — Duc M Pham
(74) *Attorney, Agent, or Firm* — NSIP Law

(57) ABSTRACT

A wireless power transmission system, and a method for controlling a resonance impedance and a resonance frequency of the wireless power transmission system are provided. According to one aspect, a wireless power transmitter may include: a power generator configured to generate tracking power using a resonance frequency, the tracking power being used for a resonance frequency tracking; a source resonator configured to transmit the tracking power to a target resonator; a mismatching detector configured to detect a mismatching between the target resonator and the source resonator; and a controller configured to adjust the resonance frequency, or an impedance of a repeater resonator when the mismatching is detected, the repeater resonator being used to perform an impedance matching between the target resonator and the source resonator.

13 Claims, 16 Drawing Sheets

(56) References Cited

FOREIGN PATENT DOCUMENTS

| JP | 2010-141976 | 6/2010 |
| JP | 2010-141977 | 6/2010 |
| KR | 2010026075 A * | 3/2010 |
| WO | WO 2010116441 A1 * | 10/2010 |

* cited by examiner

WIRELESS POWER TRANSMISSION SYSTEM, AND METHOD OF CONTROLLING RESONANCE IMPEDANCE AND RESONANCE FREQUENCY OF WIRELESS POWER TRANSMISSION SYSTEM

CROSS-REFERENCE TO RELATED APPLICATION(S)

This application claims the benefit under 35 U.S.C. §119 (a) of Korean Patent Application No. 10-2011-0044043, filed on May 11, 2011, in the Korean Intellectual Property Office, the entire disclosure of which is incorporated herein by reference for all purposes.

BACKGROUND

1. Field

The following description relates to wireless power transmission.

2. Description of Related Art

Wireless power refers to energy that is transferred from a wireless power transmitter to a wireless power receiver, for example, through a magnetic coupling or a resonance coupling. Accordingly, a typical wireless power transmission system includes a source device and a target device. The source device may wirelessly transmit a power, and the target device may wirelessly receive a power. The source device includes a source resonator, and the target device includes a target resonator. The magnetic coupling or the resonance coupling may be formed between the source resonator and the target resonator.

Due to characteristics of a wireless environment, the distance between a source resonator and a target resonator may be highly likely to vary over time, and matching requirements to match the source resonator and the target resonator may also be changed. Thus, the power transmission efficiency may be reduced.

SUMMARY

According to one general aspect, a wireless power transmitter may include: a power generator configured to generate tracking power using a resonance frequency, the tracking power being used for a resonance frequency tracking; a source resonator configured to transmit the tracking power to a target resonator; a mismatching detector configured to detect a mismatching between the target resonator and the source resonator; and a controller configured to adjust the resonance frequency, or an impedance of a repeater resonator when the mismatching is detected, the repeater resonator being used to perform an impedance matching between the target resonator and the source resonator.

The mismatching detector may detect a reflected wave of the tracking power, and may detect the mismatching between the target resonator and the source resonator based on the detected reflected wave.

The mismatching detector may compute a voltage standing wave ratio (VSWR), based on a level of an output voltage of the source resonator, and a voltage level of the reflected wave, and when the VSWR is less than a predetermined value, the mismatching detector may determine that the mismatching is detected.

Then the mismatching is not detected, the controller may control the power generator to generate power required by the wireless power receiver.

The power required by the wireless power receiver may be transmitted to the target resonator via the source resonator, and wherein the controller controls the power generator, and monitors a change of a load of the wireless power receiver, and when the change of the load is detected, the controller readjusts the impedance of the repeater resonator or the resonance frequency.

The controller may adjust the impedance of the repeater resonator to one or more of a plurality of candidate impedances in sequence, adjusts the resonance frequency to each of a plurality of candidate resonance frequencies in sequence, to track a candidate impedance where the mismatching is not detected among the plurality of candidate impedances, to track a candidate resonance frequency where the mismatching is not detected among the plurality of candidate resonance frequencies, or any combination thereof.

The wireless power may further include a resonance frequency generator, comprising a plurality of capacitors and a switch that is configured to adjust the resonance frequency by sequentially switching one or more of the plurality of capacitors.

The repeater resonator may include an impedance adjusting unit comprising a plurality of capacitors and a switch, and the impedance adjusting unit adjusts the impedance of the repeater resonator by sequentially switching one or more of the plurality of capacitors.

According to another general aspect, a wireless power transmitter may include: a power generator configured to generate a tracking power, the tracking power being used for a resonance impedance tracking or a resonance frequency tracking; a source resonator configured to transmit the tracking power to a target resonator; a communication unit configured to receive, from the wireless power receiver, information on an amount of a received power; and a controller configured to detect a mismatching between the target resonator and the source resonator, based on an amount of the tracking power, and the received information, and to adjust the resonance frequency, or an impedance of a repeater resonator when the mismatching is detected, the repeater resonator being used to perform an impedance matching between the target resonator and the source resonator.

When a ratio of the amount of the tracking power and the amount of the received power is less than a predetermined reference value, the controller may determine that the mismatching is detected.

According to yet another general aspect, a wireless power receiver may include: a target resonator configured to receive power from a source resonator via a repeater resonator; a detector configured to detect an amount of the received power; a communication unit configured to transmit, to a wireless power transmitter, information on the detected amount of the received power; a rectification unit configured to generate a direct current (DC) signal by rectifying an alternating current (AC) signal of the received power; and a DC-to-DC (DC/DC) converter configured to supply voltage of a predetermined level to a load by adjusting the level of the DC signal, wherein the target resonator forms a magnetic coupling with the source resonator, and an impedance matching between the target resonator and the source resonator is performed by the repeater resonator.

According to a further general aspect, a method of controlling a resonance frequency of a wireless power transmission system may include: generating tracking power; transmitting the tracking power to a target resonator, the tracking power being used for a resonance frequency tracking; detecting a mismatching between the target resonator and a source; and adjusting the resonance frequency when the mismatching is detected.

The detecting may include: detecting a reflected wave of the tracking power; and detecting the mismatching between the target resonator and a source resonator based on the detected reflected wave.

The detecting may include: computing a voltage standing wave ratio (VSWR), based on a level of an output voltage of the source resonator, and a voltage level of the reflected wave; and determining that the mismatching is detected, when the VSWR is less than a predetermined value.

The adjusting may include: adjusting the resonance frequency to one or more of a plurality of candidate resonance frequencies in sequence, and tracking a candidate resonance frequency where the mismatching is not detected among the plurality of candidate resonance frequencies.

The method may further include: generating power required by a wireless power receiver when the mismatching is not detected; transmitting, to the target resonator, the power required by the wireless power receiver; and monitoring a change of a load of the wireless power receiver, and readjusting the resonance frequency when the change of the load is detected.

According to another general aspect, a method of controlling a resonance impedance of a wireless power transmission system may include: generating tracking power to be used for a resonance impedance tracking; transmitting the tracking power to a target resonator; detecting a reflected wave of the tracking power, and detecting a mismatching between the target resonator and a source resonator based on the detected reflected wave; and adjusting an impedance of a repeater resonator, when the mismatching is detected, the repeater resonator being used to perform an impedance matching between the target resonator and the source resonator.

The detecting may include: computing a voltage standing wave ratio (VSWR), based on a level of an output voltage of the source resonator, and a voltage level of the reflected wave; and determining that the mismatching is detected, when the VSWR is less than a predetermined value.

The adjusting may include: adjusting the impedance of the repeater resonator to one or more of a plurality of candidate impedances in sequence, and tracking a candidate impedance where the mismatching is not detected among the plurality of candidate impedances.

The method may further include: generating power required by a wireless power receiver, when the mismatching is not detected; transmitting, to the target resonator, the generated power; and monitoring a change of a load of the wireless power receiver, and readjusting the impedance of the repeater resonator when the change of the load is detected.

According to one further general aspect, a method of controlling a resonance frequency of a wireless power transmission system may further include: generating a tracking power, by converting direct current (DC) voltage to alternating current (AC) voltage using a resonance frequency, the tracking power being used for a resonance frequency tracking; transmitting the tracking power to a target resonator via a magnetic coupling; receiving, from a wireless power receiver, information on the amount of received power; and detecting a mismatching between the target resonator and a source resonator, based on an amount of the tracking power and the received information, and adjusting the resonance frequency when the mismatching is detected.

The detecting may include determining that the mismatching is detected, when a ratio of the amount of the tracking power and the amount of the received power is less than a predetermined reference value.

The adjusting may include adjusting the resonance frequency to one or more of a plurality of candidate resonance frequencies in sequence, and tracking a candidate resonance frequency where the mismatching is not detected among the plurality of candidate resonance frequencies.

According to general aspect, a method of controlling a resonance impedance of a wireless power transmission system may include: generating a tracking power, by converting direct current (DC) voltage to alternating current (AC) voltage using a resonance frequency, the tracking power being used for a resonance impedance tracking; transmitting the tracking power to a target resonator via a magnetic coupling; receiving, from a wireless power receiver, information on an amount of a received power; detecting a mismatching between the target resonator and a source resonator, based on an amount of the tracking power and the received information, and adjusting an impedance of a repeater resonator when the mismatching is detected, the repeater resonator being used to perform an impedance matching between the target resonator and the source resonator.

The detecting may include determining that the mismatching is detected, when a ratio of the amount of the tracking power and the amount of the received power is less than a predetermined reference value.

The adjusting may include adjusting the impedance of the repeater resonator to one or more of a plurality of candidate impedances in sequence, and tracking a candidate impedance where the mismatching is not detected among the plurality of candidate impedances.

Other features and aspects will be apparent from the following detailed description, the drawings, and the claims.

Figure 1:
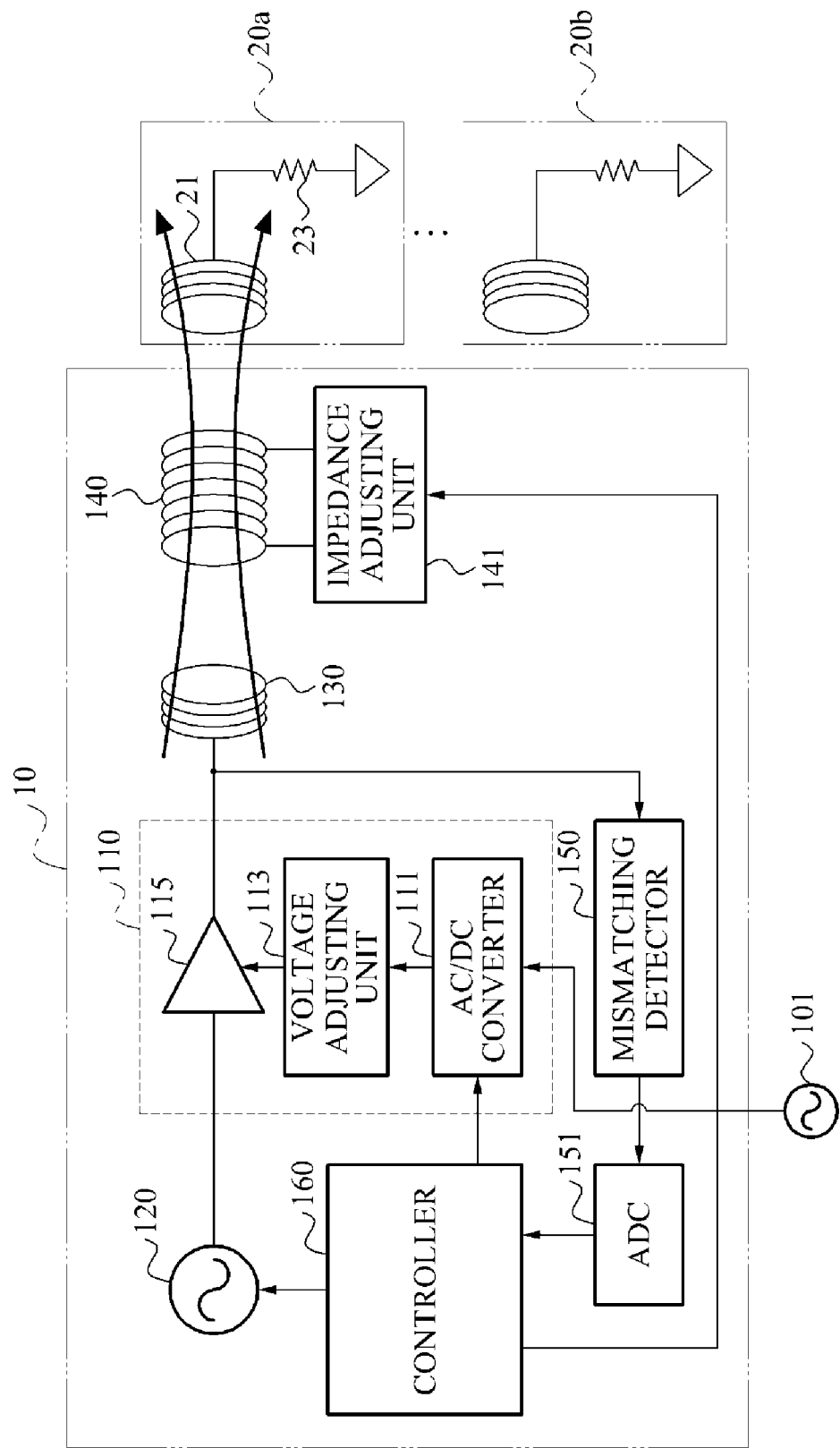
FIG. 1 is a diagram illustrating a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission system. As shown, the wireless power transmission system includes a source device 10, and a plurality of target devices, e.g., target devices 20a and 20b. The source device 10 may simultaneously transmit power to the target devices 20a and 20b.

The source device 10 includes a power generator 110, a resonance frequency generator 120, a source resonator 130, a mismatching detector 150, an analog-to-digital converter (ADC) 151, and a controller 160, as illustrated in FIG. 1. Additionally, the source device 10 may further include a repeater resonator 140. The repeater resonator 140 may include an impedance adjusting unit 141. The repeater resonator 140 may be installed inside or outside the source device 10.

The target device 20a includes a target resonator 21, and a load 23. The target device 20a may have the same or similar structure as a target device 300 illustrated in FIG. 2.

The power generator 110 may generate tracking power for a resonance impedance tracking or a resonance frequency tracking, by converting direct current (DC) voltage to alternating current (AC) voltage using a resonance frequency. Additionally, the power generator 110 may generate charging power for charging the target devices 20a and 20b.

The power generator 110 may include an AC-to-DC (AC/DC) converter 111, a voltage adjusting unit 113; and a power amplifier 115. The AC/DC converter 111 may generate DC voltage by rectifying AC voltage (e.g., in a band of tens of Hertz (Hz)) received from an external power supply device 101. The voltage adjusting unit 113 may output DC voltage at a predetermined level, and/or may adjust an output level of the DC voltage according to the control of the controller 160. The amount of power generated by the power generator 110 may be determined based on the DC voltage level output from the voltage adjusting unit 113. The power amplifier 115 may generate AC power by a switching pulse signal output from the resonance frequency generator 120.

The resonance frequency generator 120 may generate a switching pulse signal, for example, in a band of a few megahertz (MHz) to tens of MHz. The resonance frequency may be identical to a frequency of the switching pulse signal. The frequency of the switching pulse signal may be determined based on the control of the controller 160. For example, when a source resonance frequency is set to 13.56 MHz or 5.78 MHz, the controller 160 may control the resonance frequency generator 120, so that the frequency of the switching pulse signal may be set to 13.56 MHz or 5.78 MHz. The resonance frequency generator 120 may include one or more capacitors, and a switch. The resonance frequency generator 120 may be configured to adjust the resonance frequency by sequentially switching the one or more of the capacitors.

The source resonator 130 may transfer electromagnetic energy to the target resonator 21. The source resonator 130 may transfer the tracking power and/or the charging power to the target device 20a via a magnetic coupling with the target resonator 21, for instance.

The mismatching detector 150 may be configured detect a reflected wave of the tracking power, and may detect a mismatching between the target resonator 21 and the source resonator 130, based on the detected reflected wave. To detect the mismatching, the mismatching detector 150 may detect an envelope of the reflected wave, and/or detect a power amount of the reflected wave. The mismatching detector 150 may be configured to compute a voltage standing wave ratio (VSWR) based on a voltage level of the reflected wave, and based on a level of an output voltage of the source resonator 130 or the power generator 110. When the VSWR is less than a predetermined value, the mismatching detector 150 may determine that the mismatching is detected.

When the mismatching detector 150 outputs an analog signal, the ADC 151 may convert the analog signal to a digital signal, and may transfer the digital signal to the controller 160.

If a mismatch between the target resonator 21 and the source resonator 130 is detected, the controller 160 may adjust the impedance of the repeater resonator 140, the resonance frequency, or both. For example, adjusting the resonance frequency may indicate sequentially adjusting frequencies of a switching pulse signal output from the resonance frequency generator 120. Conversely, if a mismatch is not detected, the controller 160 may control the power generator 110 to generate power required by the wireless power receiver. The power required by the wireless power receiver may be used as a charging power. For example, the tracking power may have a power level of 0.1 watt (W) to 1 W, and the charging power may have a power level of 1 W to 20 W. The power required by the wireless power receiver may also be transmitted via the source resonator 130 to the target resonator 21. The controller 160 may be configured to control the power generator 110, and may then monitor a change of a load of the wireless power receiver. When the change of the load is detected, the controller 160 may readjust the impedance of the repeater resonator 140, or the resonance frequency.

The controller 160 may be configured to adjust the impedance of the repeater resonator 140 to one or more of a plurality of candidate impedances in sequence, or may adjust the resonance frequency to each of a plurality of candidate resonance frequencies in sequence, to track a candidate impedance where the mismatching is not detected among the plurality of candidate impedances, and/or to track a candidate resonance frequency where the mismatching is not detected among the plurality of candidate resonance frequencies.

The repeater resonator 140 may be positioned between the source resonator 130 and the target resonator 21, to increase a range of the magnetic coupling formed between the source resonator 130 and the target resonator 21, or to perform impedance matching. The repeater resonator 140 may have the same structure as the source resonator 130, except the impedance adjusting unit 141. For example, the repeater resonator 140 may be configured as illustrated in any of FIGS. 8 to 14B.

The impedance adjusting unit 141 may be configured to perform impedance matching between the target resonator 21 and the source resonator 130, by changing a capacitance value or inductance value of the repeater resonator 140. In some implementations, the impedance adjusting unit 141 may have the same or similar structure as an impedance adjusting unit 720 of FIG. 7. The impedance adjusting unit 141 may adjust the impedance of the repeater resonator 140 by sequentially switching one or more of the plurality of capacitors.

Figure 2:
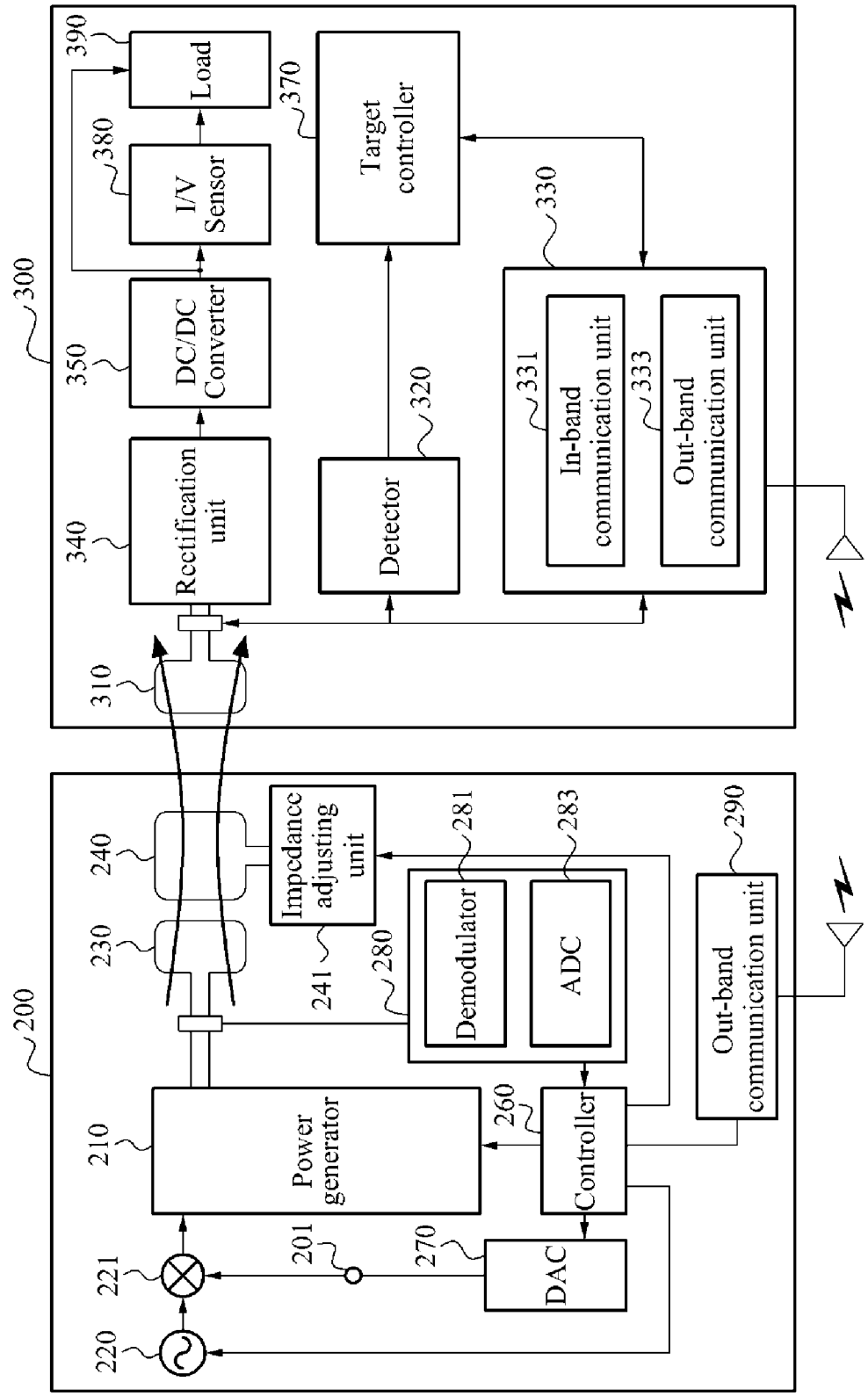
FIG. 2 is a diagram illustrating another wireless power transmission system.

FIG. 2 illustrates another wireless power transmission system.

As shown, a source device 200 includes a power generator 210, a resonance frequency generator 220, a source resonator 230, a repeater resonator 240, a controller 260, a digital-to-analog converter (DAC) 270, an in-band communication unit 280, and an out-band communication unit 290. Similarly to the repeater resonator 140 of FIG. 1, the repeater resonator 240 may include an impedance adjusting unit 241, in some embodiments. The repeater resonator 240 may be installed inside or outside the source device 200.

The power generator 210, the resonance frequency generator 220, the source resonator 230, and the repeater resonator 240 may respectively perform the same or similar operations as the power generator 110, the resonance frequency generator 120, the source resonator 130, and the repeater resonator 140 of FIG. 1, in some embodiments.

In FIG. 2, the in-band communication unit 280 and the out-band communication unit 290 may function as a communication unit of the source device 200. The in-band communication unit 280 and the out-band communication unit 290 may receive information on an amount of a received power, from the target device 300. The target device 300 may function as a wireless power receiver. The in-band communication unit 280 may perform in-band communication for transmitting or receiving data using a resonance frequency. In an in-band communication scheme, a power and a signal may be transmitted only within a coupling region between a source resonator and a target resonator. As illustrated in FIG. 2, the in-band communication unit 280 includes a demodulator 281, and an ADC 283. The demodulator 281 may demodulate a signal received from the target device 300, and the ADC 283 may convert the demodulated signal to a digital signal.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The controller 260 may detect a mismatch between the target resonator and the source resonator 230, based on an amount of a tracking power, and based on the information on the amount of the received power received from the target device 300. When a mismatch is detected, the controller 260 may adjust an impedance of the repeater resonator 240, or the resonance frequency. When a ratio of the amount of the tracking power and the amount of the received power is less than a predetermined reference value, the controller 260 may determine that the mismatch has been detected.

In FIG. 2, a modulator 221 may generate a modulation signal, in response to a control signal 201 received from the controller 260. The modulator 221 may generate a modulation signal for in-band communication, using various schemes. To generate a modulation signal, the modulator 221 may turn on or off an output signal of the resonance frequency generator 220, or may perform delta-sigma modulation. Additionally, the modulator 221 may generate a pulse-width modulation (PWM) signal with a predetermined envelope.

The out-band communication unit 290 may perform an out-band communication with the target device 300. For example, the out-band communication may refer to a communication via a communication channel, such as, Zigbee, Bluetooth, and the like.

Referring to FIG. 2, the target device 300 as the wireless power receiver includes a target resonator 310, a detector 320, a communication unit 330, a rectification unit 340, and a DC-to-DC (DC/DC) converter 350. The target device 300 may further include a target controller 370, a current/voltage (I/V) sensor 380, and a load 390.

The target resonator 310 may be identical to the target resonator 21 of FIG. 1. The target resonator 310 may receive power from the source resonator 230 through the repeater resonator 240. The target resonator 310 may form a magnetic or resonance coupling with the source resonator 230. Impedance matching between the target resonator 310 and the source resonator 230 may be performed by the repeater resonator 240.

The detector 320 may detect an amount of the power received to the target resonator 310. For example, the detector 320 may detect the amount of the received power, by measuring a current flowing in the target resonator 310, or measuring a voltage applied to the target resonator 310. Additionally, the detector 320 may detect the amount of received power, for instance, by measuring an output voltage and/or a current of the rectification unit 340 or the DC/DC converter 350.

The communication unit 330 may transmit, to a wireless power transmitter, such as the source resonator 200, the information on the detected amount of the received power. The communication unit 330 may include an in-band communication unit 331 configured to perform an in-band communication, and an out-band communication unit 333 configured to perform an out-band communication. The in-band communication unit 331 may detect an output signal of the target resonator 310 or the rectification unit 340, and may demodulate data received from the source device 200 through an envelope of the detected signal. The in-band communication unit 331 may adjust an impedance of the target resonator 310, and may transmit data to the source device 200. For example, the in-band communication unit 331 may increase the impedance of the target resonator 310, so that a reflected wave for communication may be detected from the source device 200. Depending on whether the reflected wave for communication is detected, the in-band communication unit 280 of the source device 200 may detect a binary number (e.g., "0" or "1").

The rectification unit 340 may generate a DC signal by rectifying an AC signal of the power received to the target resonator 310. Thus, the rectification unit 340 may generate DC voltage by rectifying AC voltage.

The DC/DC converter 350 may adjust a level of the DC signal, and may supply a voltage of a predetermined level to the load 390. For example, the DC/DC converter 350 may adjust the level of DC voltage output from the rectification unit 340 to be between 3 to 10V.

The target controller 370 may receive, from the detector 320, the information on the detected amount of the received power. Additionally, the target controller 370 may control the communication unit 330. Furthermore, the target controller 370 may receive a measurement value transferred from the UV sensor 380, and may transmit the measurement value to the source device 200 via the communication unit 330.

The I/V sensor 380 may measure an output voltage value and a current value of the DC/DC converter 350. In some instances, the UV sensor 380 may also be configured to measure an output voltage value and a current value of the rectification unit 340.

The load 390 may include at least one battery. The load 390 may charge the at least one battery with DC voltage output from the DC/DC converter 350.

Figure 3:
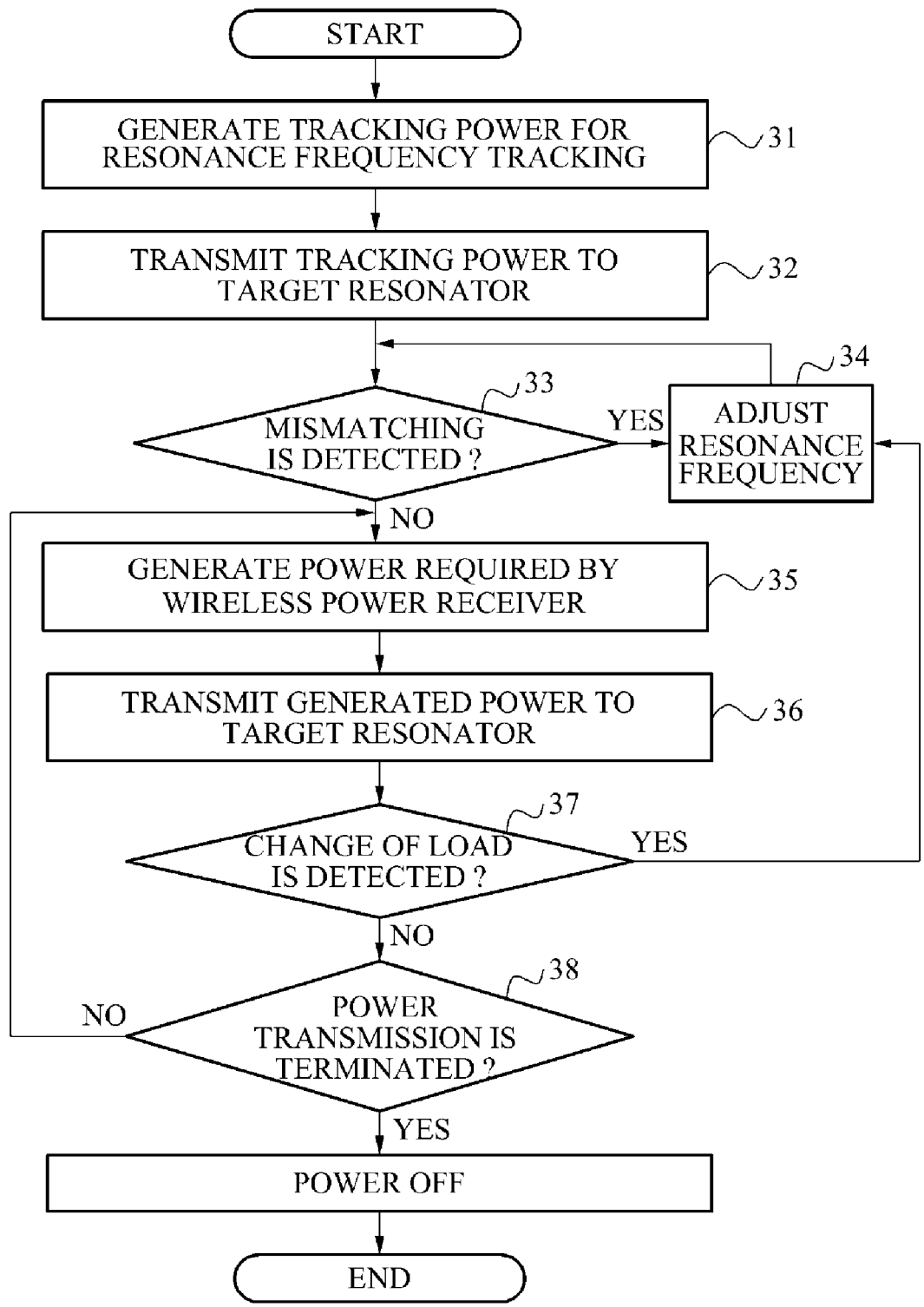
FIG. 3 is a flowchart illustrating a method of controlling a resonance frequency of a wireless power transmission system.

FIG. 3 illustrates a method of controlling a resonance frequency of a wireless power transmission system. The method of FIG. 3 may be performed by a source device, for example.

Referring to FIG. 3, in operation 31, the source device generates tracking power for a resonance frequency tracking, for example, by converting DC voltage to AC voltage using a resonance frequency.

In operation 32, the source device transmits the tracking power to a target resonator via a magnetic coupling, for instance.

In operation 33, the source device detects a reflected wave of the transmitted tracking power, and detects a mismatching between the target resonator and a source resonator, based on the detected reflected wave. The source device may compute or determine a VSWR, based on a level of an output voltage of the source resonator, and based on a voltage level of the reflected wave. When the VSWR is less than a predetermined value, the source device may determine that the mismatching is detected.

When mismatching is detected in operation 33, the source device adjusts the resonance frequency in operation 34. The source device may adjust the resonance frequency to one or more of a plurality of candidate resonance frequencies in sequence, and may track a candidate resonance frequency where the mismatching is not detected among the plurality of candidate resonance frequencies. After performing operation 34, the source device may re-perform operation 32 and/or operation 33, if necessary.

Conversely, when the mismatching is not detected in operation 33, the source device generates power required by a wireless power receiver in operation 35.

In operation 36, the source device transmits, to the target resonator, the power required by the wireless power receiver. After operation 36, the source device may monitor a change of a load of the wireless power receiver.

In operation 37, the source device determines whether the change of the load of the wireless power receiver is detected. When the change of the load is detected in operation 37, the source device may revert to operation 34, to readjust the resonance frequency.

In operation 38, the source device determines whether power transmission is terminated. When the power transmission is terminated, the source device may be powered off. Termination of the power transmission may be detected via communication with the target device. The source device may repeatedly perform operations 35 through 38, until the power transmission is terminated, as necessary.

Figure 4:
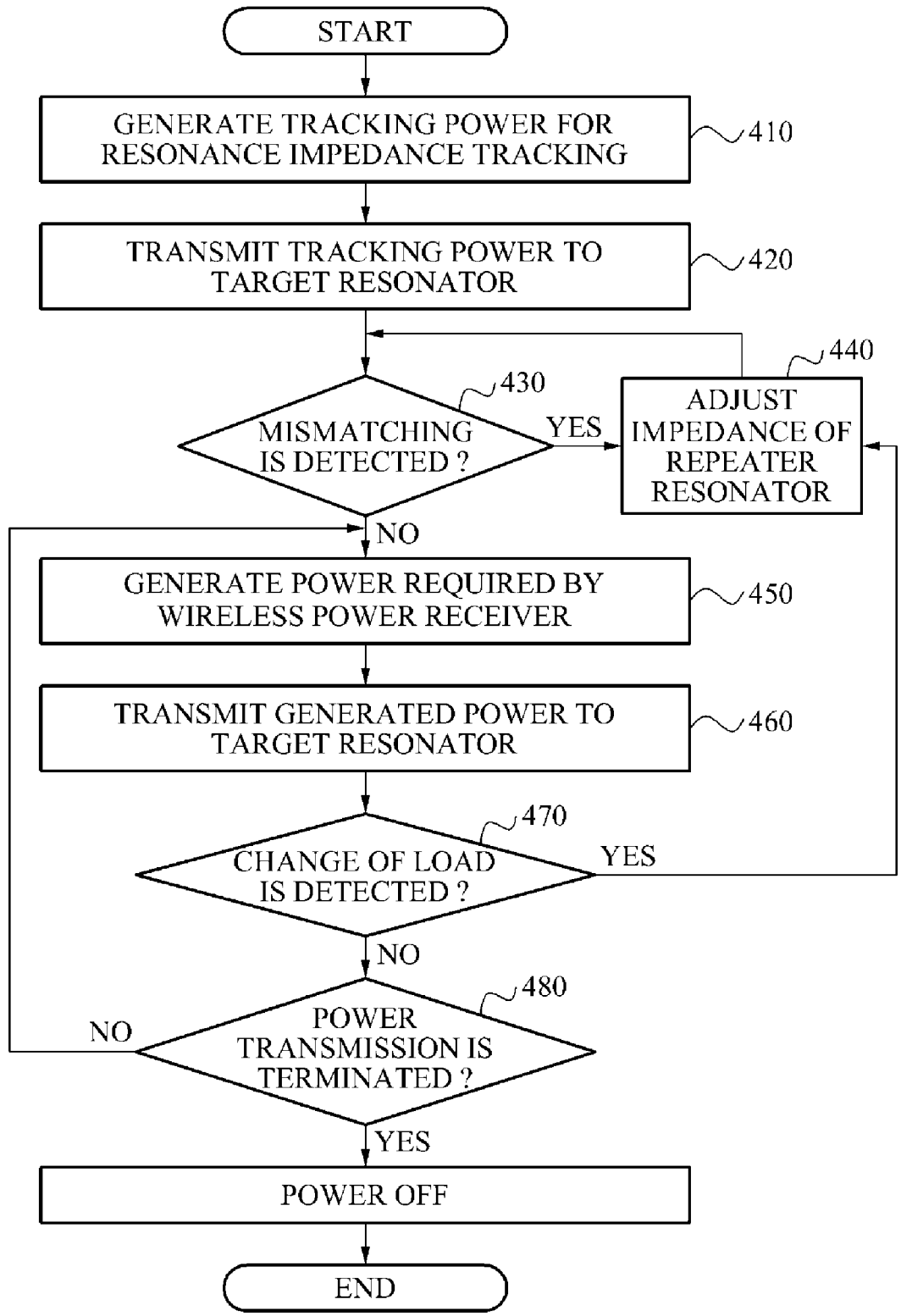
FIG. 4 is a flowchart illustrating a method of controlling a resonance impedance of a wireless power transmission system.

FIG. 4 illustrates a method of controlling a resonance impedance of a wireless power transmission system. The method of FIG. 4 may be performed by a source device, for example.

Referring to FIG. 4, in operation 410, the source device generates tracking power for a resonance impedance tracking, by converting DC voltage to AC voltage using a resonance frequency.

In operation 420, the source device transmits the tracking power to a target resonator, for instance, via a magnetic coupling.

In operation 430, the source device detects a reflected wave of the transmitted tracking power, and detects mismatching between the target resonator and a source resonator, based on the detected reflected wave. The source device may compute a VSWR, based on the level of the output voltage of the source resonator and the voltage level of the reflected wave. When the VSWR is less than a predetermined value, the source device may determine that a mismatching is detected.

When the mismatching is detected in operation 430, the source device adjusts an impedance of a repeater resonator in operation 440. The source device may adjust the impedance of the repeater resonator for one or more of a plurality of candidate impedances in sequence, and may track one or more candidate impedances where the mismatching is not detected among the plurality of candidate impedances. After performing operation 440, the source device may re-perform operation 420 and/or operation 430, as necessary.

Conversely, when the mismatching is not detected in operation 430, the source device generates power required by a wireless power receiver in operation 450.

In operation 460, the source device transmits, to the target resonator, the power required by the wireless power receiver. After operation 460, the source device monitors a change of a load of the wireless power receiver.

In operation 470, the source device determines whether the change of the load of the wireless power receiver is detected. When the change of the load is detected in operation 470, the source device may revert to operation 440, to readjust the impedance of the repeater resonator.

In operation 480, the source device determines whether a power transmission is terminated. When the power transmission is terminated, the source device may be powered OFF. Termination of the power transmission may be detected via communication with the target device. The source device may repeatedly perform operations 450 through 480, until the power transmission is terminated, as necessary.

Figure 5:
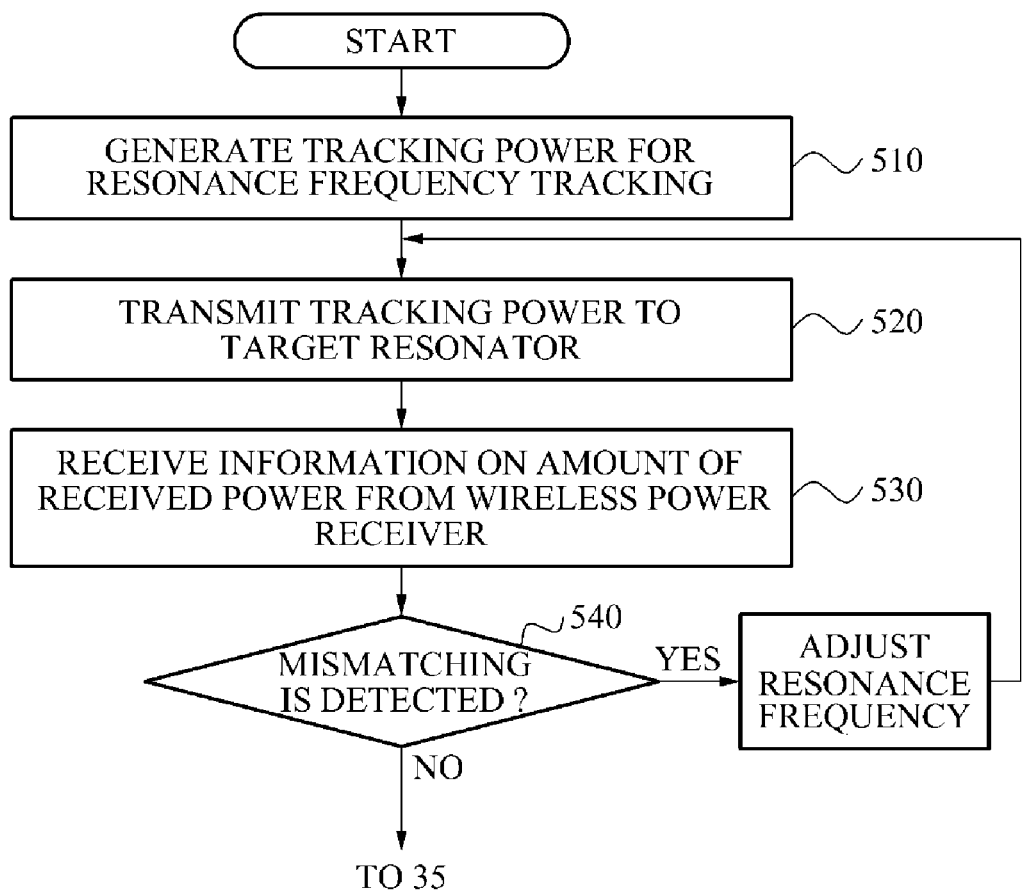
FIG. 5 is a flowchart illustrating another method of controlling a resonance frequency of a wireless power transmission system.

FIG. 5 illustrates another method of controlling a resonance frequency of a wireless power transmission system. The method of FIG. 5 may be performed by a source device, for example.

Referring to FIG. 5, in operation 510, the source device generates tracking power for a resonance frequency tracking, for example, by converting DC voltage to AC voltage using a resonance frequency.

In operation 520, the source device transmits the tracking power to a target resonator via a magnetic coupling, for instance.

In operation 530, the source device receives, from a wireless power receiver, information on the amount of received power.

In operation 540, the source device detects a mismatching between the target resonator and a source resonator, based on an amount of the tracking power, and based on the information received from the wireless power receiver.

If the mismatching is detected in operation 540, the source device adjusts the resonance frequency. The source device may adjust the resonance frequency to one or more of a plurality of candidate resonance frequencies in sequence, and may track a candidate resonance frequency where the mismatching is not detected among the plurality of candidate resonance frequencies. The source device may re-perform operations 520 through 540, after adjusting the resonance frequency, as necessary. When a ratio of the amount of the tracking power and the amount of the received power is less than a predetermined reference value, the source device may determine that the mismatching is detected.

Conversely, when the mismatching is not detected in 540, the source device may perform operations 35 through 38 of FIG. 3.

Figure 6:
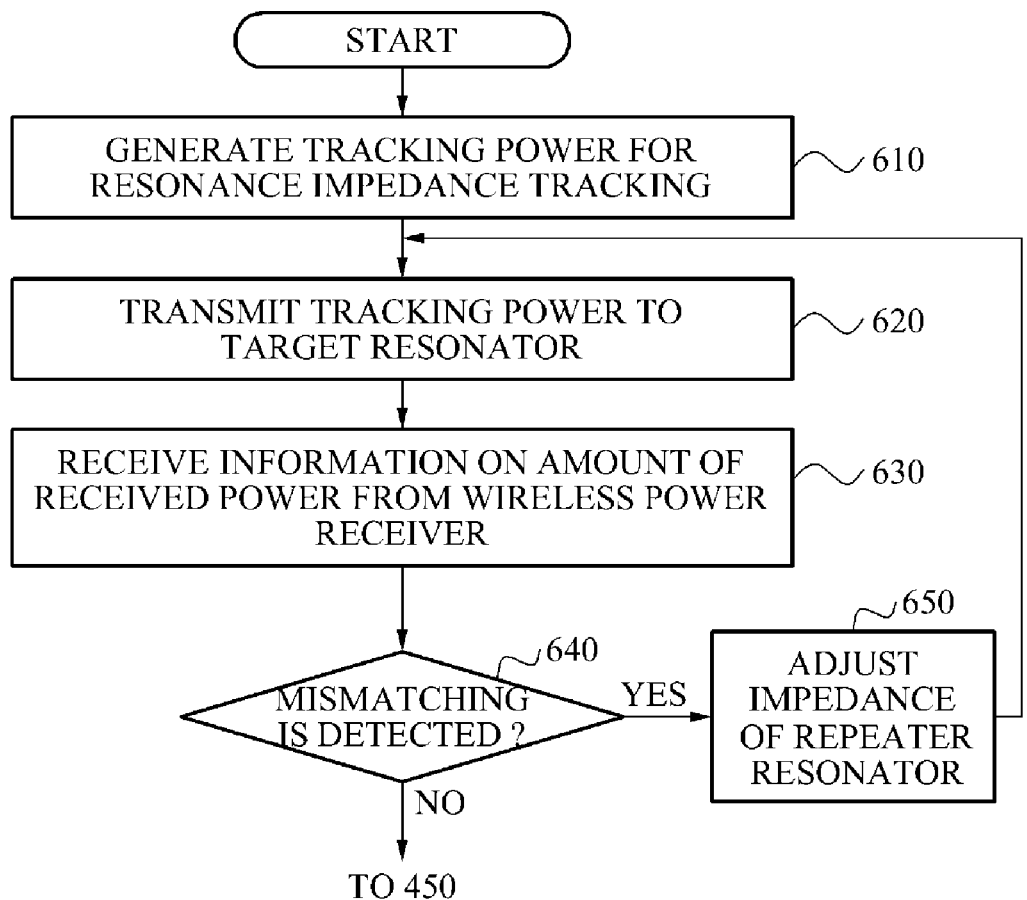
FIG. 6 is a flowchart illustrating another method of controlling a resonance impedance of a wireless power transmission system.

FIG. 6 illustrates another method of controlling a resonance impedance of a wireless power transmission system. The method of FIG. 6 may be performed by a source device, for example.

Referring to FIG. 6, in operation 610, the source device generates tracking power for resonance impedance tracking, by converting DC voltage to AC voltage using a resonance frequency.

In 620, the source device transmits the tracking power to a target resonator, for instance, via a magnetic coupling.

In 630, the source device receives, from a wireless power receiver, information on the amount of received power.

In 640, the source device detects a mismatching between the target resonator and a source resonator, based on the amount of the tracking power, and based on the information received from the wireless power receiver.

If the mismatching is detected in operation 640, the source device adjusts an impedance of a repeater resonator in operation 650. The source device may adjust the impedance of the repeater resonator for one or more of a plurality of candidate impedances in sequence, and may track one or more candidate impedances where the mismatching is not detected among the plurality of candidate impedances. In addition, the source device may re-perform operations 620 through 640, after performing operation 650, as necessary. When a ratio of the amount of the tracking power and the amount of the received power is less than a predetermined reference value, the source device may determine that the mismatching is detected.

Conversely, when the mismatching is not detected in operation 640, the source device may perform operations 450 through 480 of FIG. 4.

Figure 7:
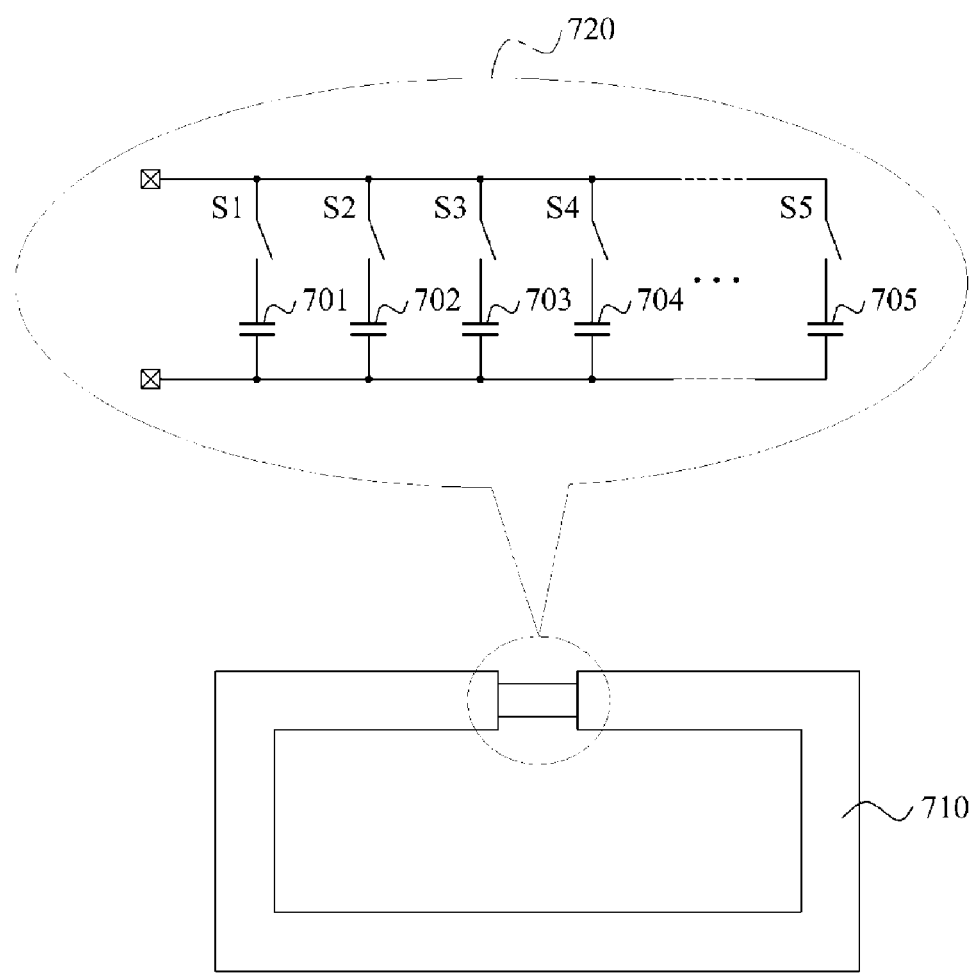
FIG. 7 is a diagram illustrating an impedance adjusting unit for use with a repeater resonator.

FIG. 7 illustrates an impedance adjusting unit for use with a repeater resonator.

Referring to FIG. 7, in some embodiments, a repeater resonator 710 may be either the repeater resonator 140 of FIG. 1 or the repeater resonator 240 of FIG. 2. Similarly, in some embodiments, the impedance adjusting unit 720 may be either the impedance adjusting unit 141 of FIG. 1 or the impedance adjusting unit 241 of FIG. 2.

The resonance impedance may be matched by sequentially turning ON or OFF a plurality of switches S1, S2, S3, S4, and S5 that respectively correspond to a plurality of capacitors 701, 702, 703, 704, and 705. The operation of adjusting an impedance of a repeater, for example, operation 440 of FIG. 4 and operation 650 of FIG. 6, may indicate sequentially turning ON or OFF the plurality of switches S1, S2, S3, S4, and S5. For example, when a mismatching occurs, the impedance adjusting unit 720 may turn ON the switch S1, and may turn OFF the switches S2, S3, S4, and S5. Subsequently, the source device may re-determine whether the mismatching is detected. When the mismatching is redetected, the impedance adjusting unit 720 may turn ON the switch S2, and may turn OFF the switches S1, S3, S4, and S5. The switches S1, S2, S3, S4, and S5 may be sequentially or randomly turned ON or OFF, for instance.

The capacitors 701, 702, 703, 704, and 705 of FIG. 7 may be designed or selected to have different capacitance values corresponding to frequency offsets.

A structure of the impedance adjusting unit 720 illustrated in FIG. 7 may be applied to resonance frequency tracking. For example, the structure of the impedance adjusting unit 720 of FIG. 7 may be applied to the resonance frequency generator 120 of FIG. 1, to sequentially change capacitance values.

According to various embodiments, it may be possible to reduce a loss of a transmitted power without using a separate matching circuit, by controlling the resonance frequency in a wireless power transmission system. Additionally, in a wireless power transmission system, it may be possible to reduce a loss of a transmitted power, by controlling an impedance of a repeater resonator.

In one or more embodiments, a source resonator and/or a target resonator may be configured as, for example, a helix coil structured resonator, a spiral coil structured resonator, a meta-structured resonator, and the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a predetermined magnetic field in a corresponding material and a magnetic flux density occurring with respect to the predetermined magnetic field in a vacuum state. The magnetic permeability and the permittivity, in some embodiments, may be used to determine a propagation constant of a corresponding material in a predetermined frequency or a predetermined wavelength. An electromagnetic characteristic of the corresponding material may be determined based on the magnetic permeability and the permittivity. According to as aspect, the metamaterial may be easily disposed in a resonance state without significant material size changes. Thus may be practical for a relatively large wavelength area or a relatively low frequency area.

FIGS. 8 through 14B illustrate various resonator structures.

Figure 8:
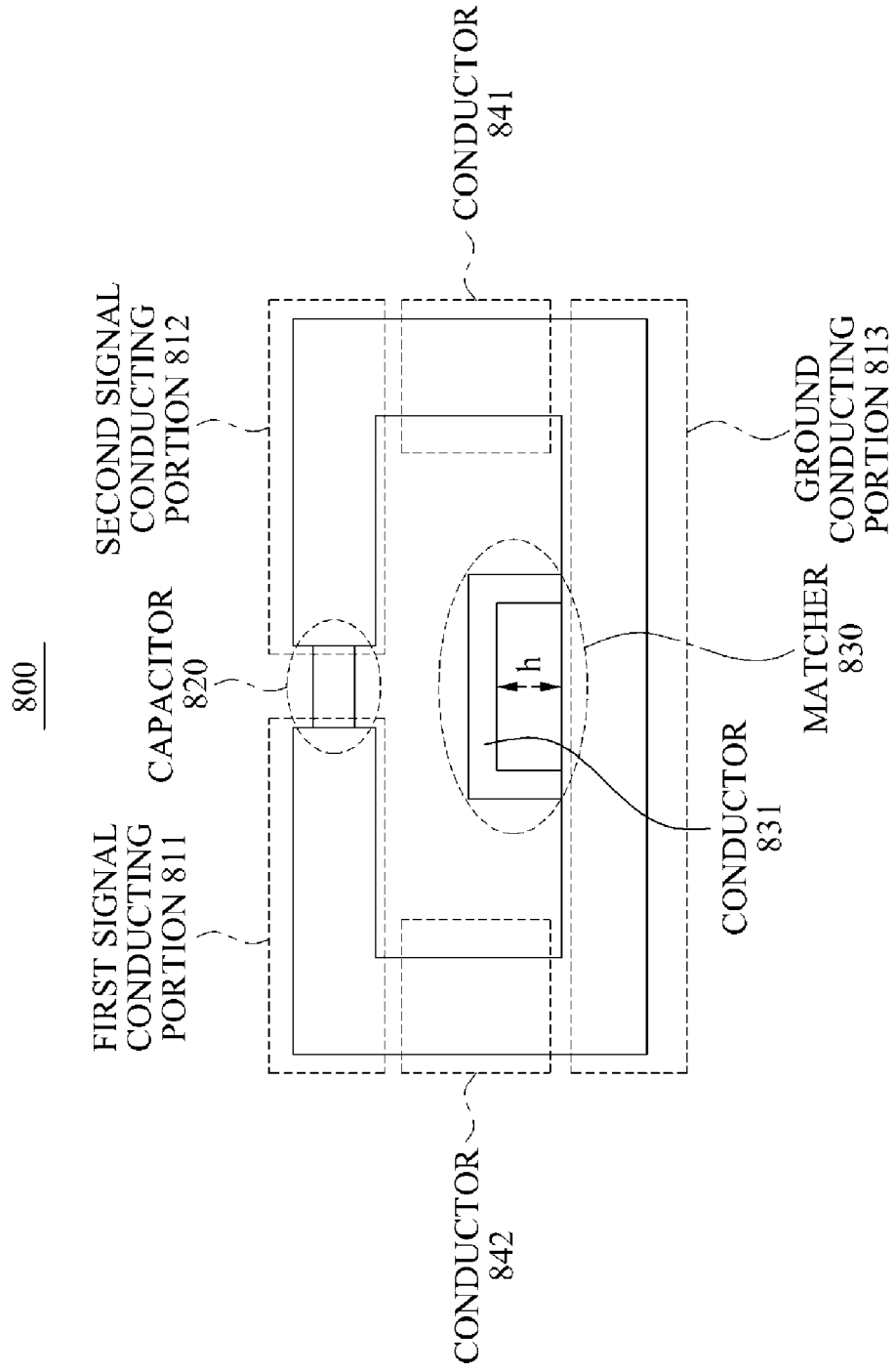
FIGS. 8 through 14B are diagrams illustrating various resonator structures.

FIG. 8 is an illustration of a two-dimensional (2D) resonator 800.

As shown, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 such that an electric field may be confined within the capacitor 820, as illustrated in FIG. 8. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. As illustrated in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to the conductor 842, and another end of the first signal conducting portion 811 may be connected to the capacitor 820. And one end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 may have an electrically closed-loop structure. The term "closed-loop structure" as used herein, may include a polygonal structure, for example, a circular structure, a rectangular structure, or the like that is a circuit that is electrically closed.

The capacitor 820 may be inserted into an intermediate portion of the transmission line. For example, the capacitor 820 may be inserted into a space between the first signal conducting portion 811 and the second signal conducting portion 812. The capacitor 820 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may also be referred to as an MNG resonator. Various criteria may be applied to determine the capacitance of the capacitor 820. For example, the various criteria may include one or more of the following: a criterion to enable the resonator 800 to have the characteristic of the metamaterial, a criterion to enable the resonator 800 to have a negative magnetic permeability in a target frequency, a criterion to enable the resonator 800 to have a zeroth order resonance characteristic in the target frequency, or the like. The resonator 800, also referred to as the MNG resonator 800, may also have a zeroth order resonance characteristic (i.e., having, as a resonance frequency, a frequency when a propagation constant is "0"). If the resonator 800 has the zeroth order resonance characteristic, the resonance frequency may be independent with respect to a physical size of the MNG resonator 800. Moreover, by appropriately designing the capacitor 820, the MNG resonator 800 may sufficiently change the resonance frequency without physically changing the physical size of the MNG resonator 800.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 to be used in impedance matching. For example, the matcher 830 may be configured to appropriately determined and adjust the strength of a magnetic field of the MNG resonator 800. Depending on the configuration, current may flow in the MNG resonator 800 via a connector, or may flow out from the MNG resonator 800 via the connector. The connector may be connected to the ground conducting portion 813 or the matcher 830. In some instances, the power may be transferred through coupling without using a physical connection between the connector and the ground conducting portion 813 or the matcher 830.

As illustrated in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 to be used in the impedance matching positioned in a location that is separate from the ground conducting portion 813 by a distance h. The impedance of the resonator 800 may be changed by adjusting the distance h.

In some embodiments, a controller may be provided to control the matcher 830. In this example, the matcher 830 may change the physical shape of the matcher 830 based on a control signal generated by the controller. For example, the distance h between the conductor 831 of the matcher 830 and the ground conducting portion 813 may be increased or decreased based on the control signal. Accordingly, the physical shape of the matcher 830 may be changed such that the impedance of the resonator 800 may be adjusted.

The matcher 830 may be provided that is configured as a passive element such as the conductor 831, for example. Of course, in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active element is a diode included in the matcher 830, the impedance of the resonator 800 may be adjusted depending on whether the diode is in an ON state or in an OFF state.

In some instances, a magnetic core may be further provided to pass through the MNG resonator 800. The magnetic core may perform a function of increasing the power transmission distance.

Figure 9:
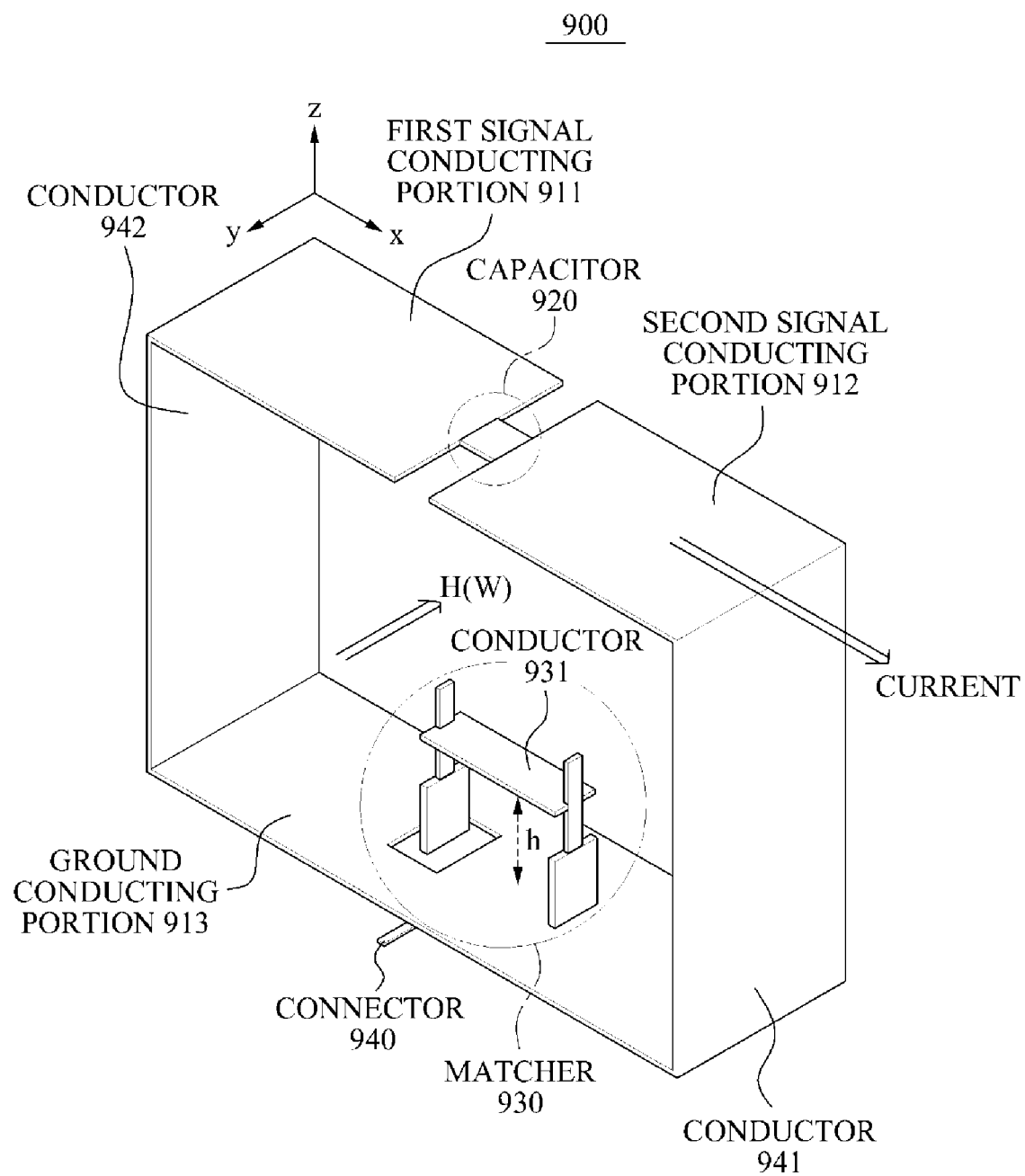

FIG. 9 is an illustration of a three-dimensional (3D) resonator 900.

Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link such that an electric field may be substantially confined within the capacitor 920.

As illustrated in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arraignment, current may flow in an x direction through the first signal conducting portion 911 and the second signal conducting portion 912. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 911 may be electrically connected (i.e., shorted) to the conductor 942, and another end of the first signal conducting portion 911 may be connected to the capacitor 920. And one end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other such that the resonator 900 may have an electrically closed-loop structure. As illustrated in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, and the like. In one implementation, a distributed capacitor may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above. For example, when the capacitor is configured as a lumped element, the resonator 900 may have the characteristic of the metamaterial. When the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the various criteria may include one or more of the following: a criterion to enable the resonator 900 to have the characteristic of the metamaterial, a criterion to enable the resonator 900 to have a negative magnetic permeability in a target frequency, a criterion to enable the resonator 900 to have a zeroth order resonance characteristic in the target frequency, or the like. Based on at least one criterion among the aforementioned criteria, the capacitance of the capacitor 920 may be determined.

The resonator 900, also referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing the capacitor 920, the MNG resonator 900 may sufficiently change the resonance frequency without significantly changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. Since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant. The MNG resonator 900 may have a relatively high Q-factor using the capacitor 920 of the lumped element and thus, it may be possible to enhance an efficiency of power transmission.

Also, the MNG resonator 900 may include the matcher 930 to be used in impedance matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As illustrated in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 to be used in the impedance matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. For example, one or more conductors may be included in the matcher 930 and the distance h may be adjusted by adaptively activating one of the conductors. Alternatively or additionally, the distance h may be adjusted by adjusting the physical location of the conductor 931 up and down. For instance, the distance h may be controlled based on the control signal of the controller. The controller may generate the control signal using various factors.

As illustrated in FIG. 9, the matcher 930 may be configured as a passive element such as the conductor 931, for instance. Of course, in other embodiments, the matcher 930 may be configured as an active element such as a diode, a transistor, or the like. If the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an ON state or in an OFF state.

In some implementations, a magnetic core may be further provided to pass through the resonator 900 configured as the MNG resonator. The magnetic core may increase the power transmission distance.

Figure 10:
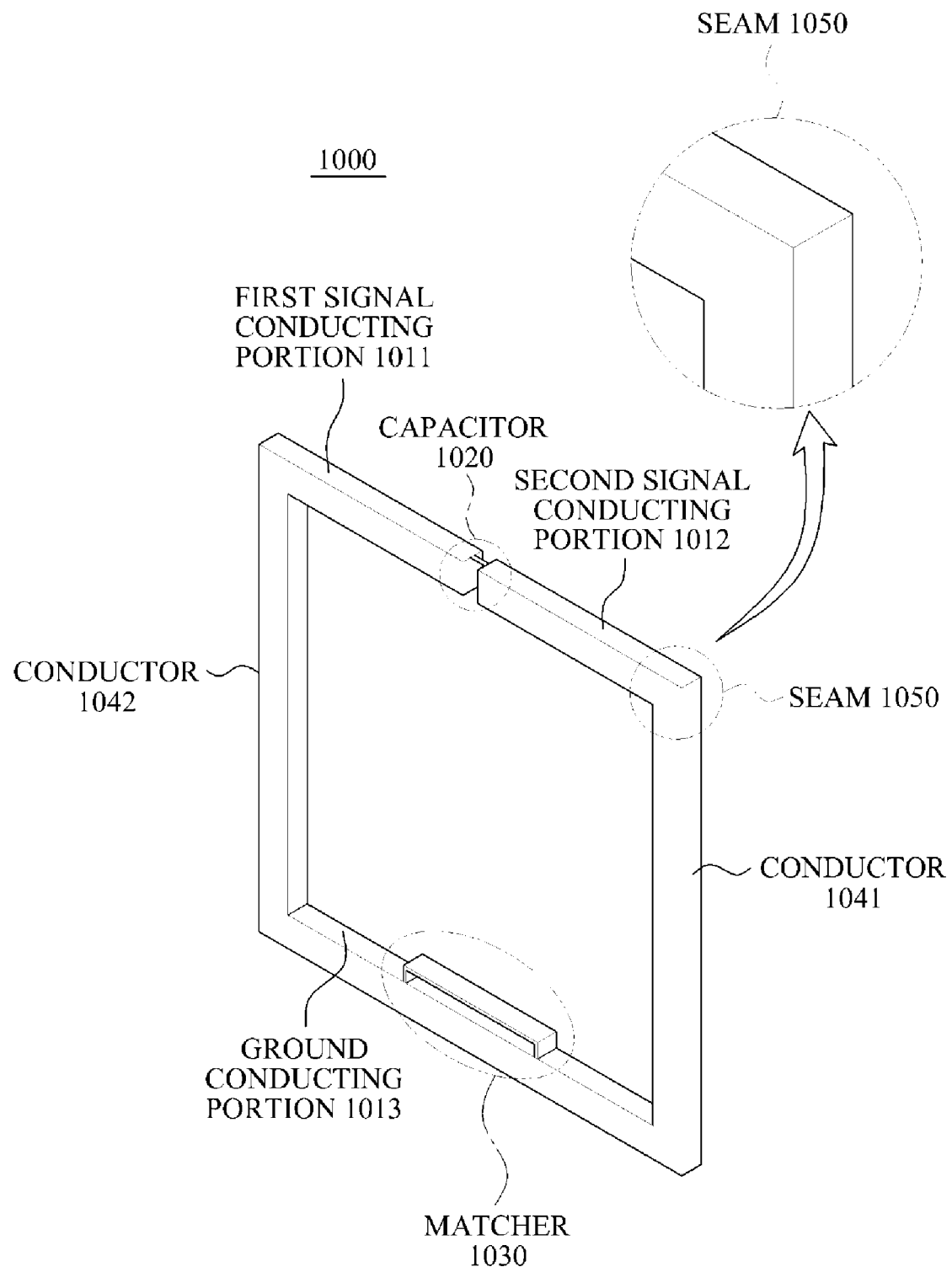

FIG. 10 illustrates a resonator 1000 for a wireless power transmission configured as a bulky type.

As used herein, the term "bulky type" may refer to a seamless connection connecting at least two parts in an integrated form.

Referring to FIG. 10, a first signal conducting portion 1011 and a conductor 1042 may be integrally formed, rather than being separately manufactured and being connected to each other. Similarly, a second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. The second signal conducting portion 1012 and the conductor 1041 may be connected to each other without using a separate seam (i.e., seamlessly connected to each other). Accordingly, it may be possible to decrease a conductor loss caused by the seam 1050. Similarly, the second signal conducting portion 1012 and a ground conducting portion 1013 may be seamlessly and integrally manufactured. In addition, the first signal conducting portion 1011 and the ground conducting portion 1013 may be seamlessly and/or integrally manufactured.

A matcher 1030 may be provided that is similarly constructed as described herein in one or more embodiments.

Figure 11:
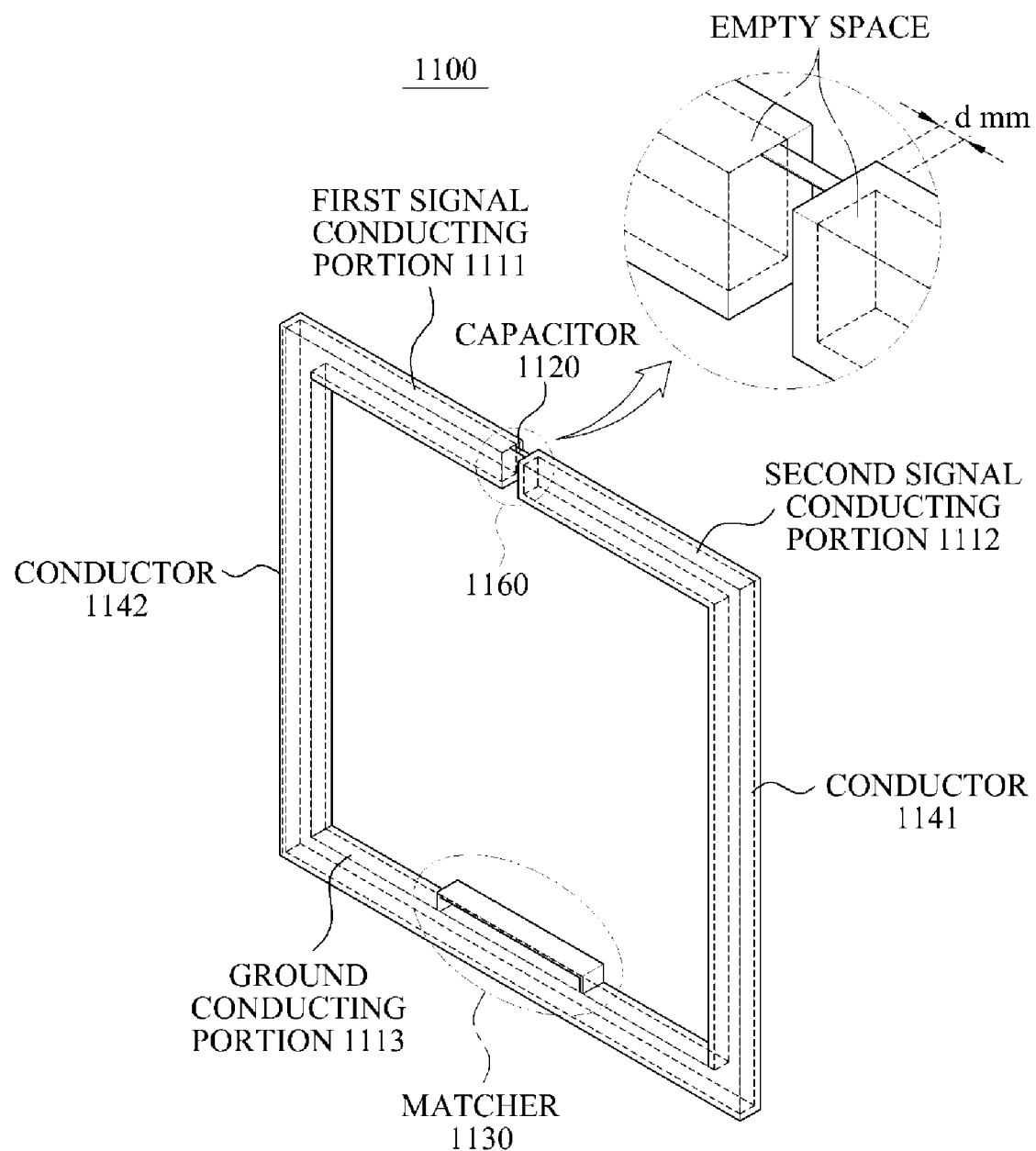

FIG. 11 illustrates a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that may include an empty space inside.

For a given resonance frequency, an active current may be modeled to flow in only a portion of the first signal conducting portion 1111 instead of all of the first signal conducting portion 1111, a portion of the second signal conducting portion 1112 instead of all of the second signal conducting portion 1112, a portion of the ground conducting portion 1113 instead of all of the ground conducting portion 1113, and portions of the conductors 1141 and 1142 instead of all of the conductors 1141 and 1142. When the depth of one or more of the first signal conducting portion 1111, the second signal conducting portion 1112, the ground conducting portion 1113, and the conductors 1141 and 1142 is significantly deeper than a corresponding skin depth in the predetermined resonance frequency, such a structure may be ineffective. The significantly deeper depth may, however, increase the weight or manufacturing costs of the resonator 1100, in some instances.

Accordingly, for the given resonance frequency, the depth of one or more of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When one or more of the first signal conducting portion 1111, the second signal conducting portion 1112, the ground conducting portion 1113, and the conductors 1141 and 1142 have an appropriate depth deeper than a corresponding skin depth, the resonator 1100 may be manufactured to be lighter, and the manufacturing costs of the resonator 1100 may also decrease.

For example, as illustrated in FIG. 11, the depth of the second signal conducting portion 1112 (as further illustrated in the enlarged view region 1160 indicated by a circle) may be determined as "d" mm, and d may be determined according to $$d = \frac{1}{\sqrt{\pi f \mu \sigma}}.$$

Here, f denotes a frequency, $\mu$ denotes a magnetic permeability, and $\sigma$ denotes a conductor constant. In one implementations, when the first signal conducting portion 1111, the second signal conducting portion 1112, the ground conducting portion 1113, and the conductors 1141 and 1142 are made of copper and they may have a conductivity of $5.8 \times 10^7$ siemens per meter (S·m$^{-1}$), the skin depth may be about 0.6 mm with respect to 10 kHz of the resonance frequency, and the skin depth may be about 0.006 mm with respect to 100 MHz of the resonance frequency.

A capacitor 1120 and a matcher 1130 may be provided that are similarly constructed as described herein in one or more embodiments.

Figure 12:
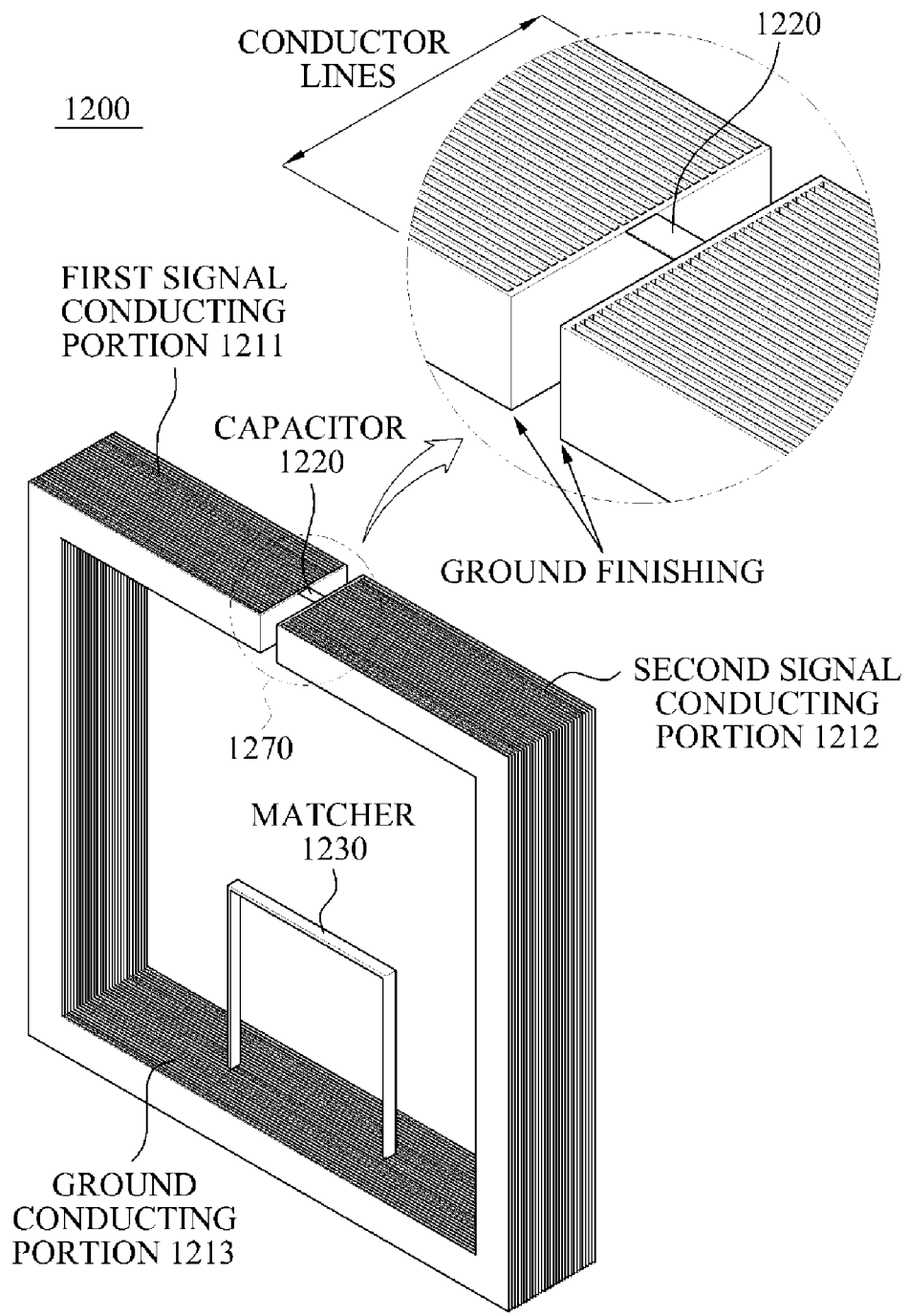

FIG. 12 illustrates a resonator 1200 for a wireless power transmission using a parallel-sheet configuration.

Referring to FIG. 12, the parallel-sheet configuration may be applicable to a first signal conducting portion 1211 and a second signal conducting portion 1212 included in the resonator 1200.

The first signal conducting portion 1211 and/or the second signal conducting portion 1212 may not be perfect conductors, and thus may have an inherent resistance. Due to this resistance, an ohmic loss may occur. The ohmic loss may decrease a Q-factor and may also decrease a coupling effect.

By applying the parallel-sheet configuration to each of the first signal conducting portion 1211 and the second signal conducting portion 1212, it may be possible to decrease the ohmic loss, and to increase the Q-factor and the coupling effect. Referring to the enlarged portion 1270 (indicated by a circle in FIG. 12), when the parallel-sheet configuration is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

As described above, when the parallel-sheet configuration is applied to one or both of the first signal conducting portion 1211 and the second signal conducting portion 1212, the plurality of conductor lines may be disposed in parallel.

Accordingly, the sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments.

Figure 13:
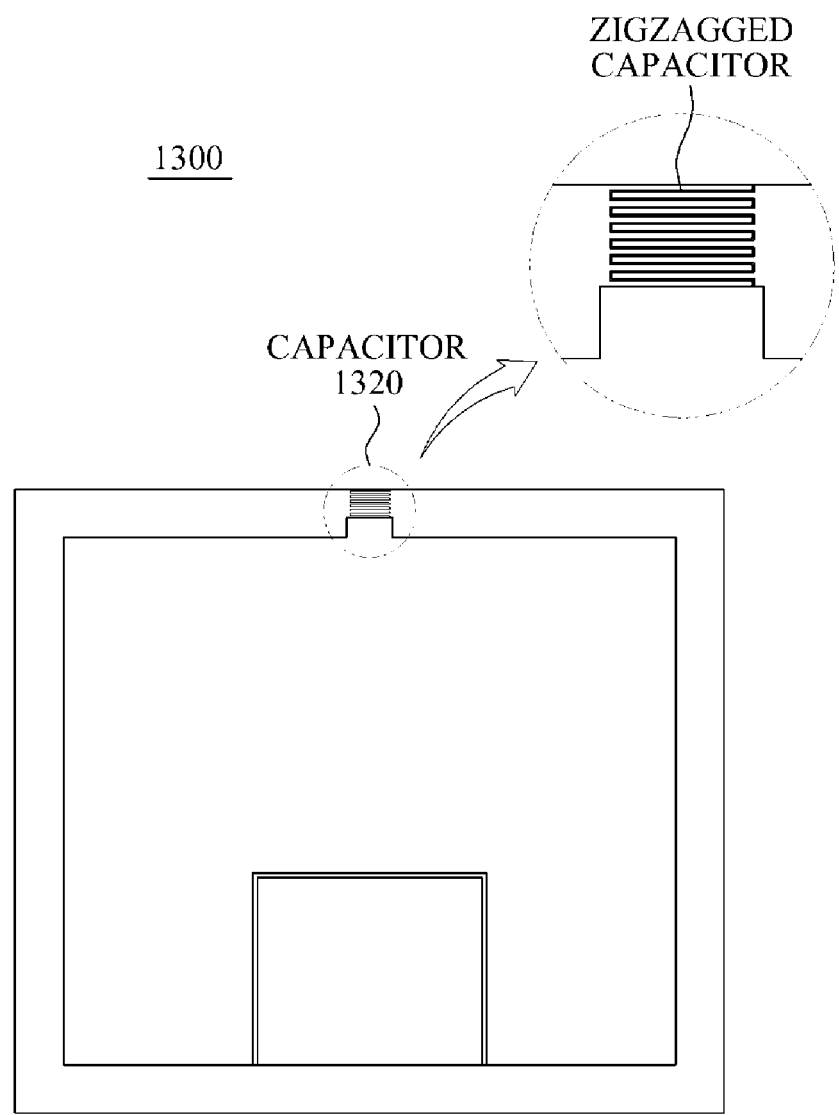

FIG. 13 illustrates a resonator 1300 for a wireless power transmission including a distributed capacitor.

Referring to FIG. 13, a capacitor 1320 included in the resonator 1300 is configured for the wireless power transmission. A capacitor used as a lumped element may have a relatively high equivalent series resistance (ESR). A variety of schemes have been proposed to decrease the ESR contained in the capacitor of the lumped element. According to an example embodiment, by using the capacitor 1320 as a distributed element, it may be possible to decrease the ESR. As will be appreciated, a loss caused by the ESR may decrease a Q-factor and a coupling effect.

As illustrated in FIG. 13, the capacitor 1320 may be configured as a conductive line having the zigzagged structure.

By employing the capacitor 1320 as the distributed element, it may be possible to decrease the loss occurring due to the ESR in some instances. In addition, by disposing a plurality of capacitors as lumped elements, it may be possible to decrease the loss occurring due to the ESR. Since a resistance of the capacitors as the lumped elements decreases through a parallel connection, active resistances of parallel-connected capacitors as the lumped elements may also decrease such that the loss occurring due to the ESR may decrease. For example, by employing ten capacitors of 1 pF each instead of using a single capacitor of 10 pF, it may be possible to decrease the loss occurring due to the ESR.

Figure 14A:
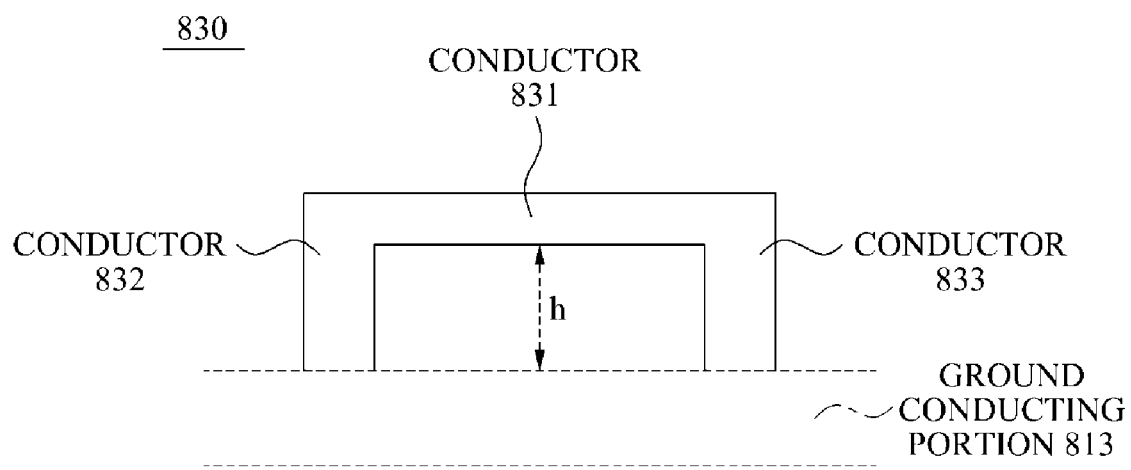
Figure 14B:
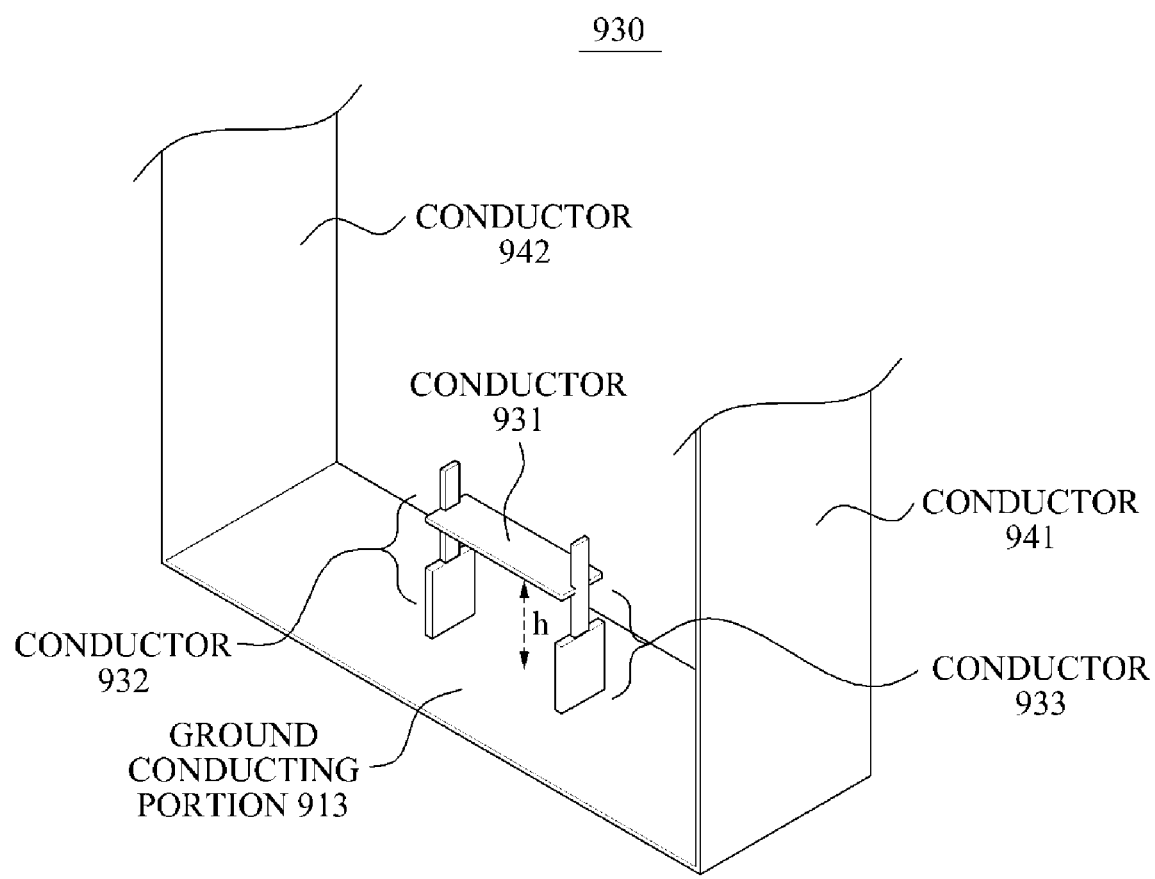

FIG. 14A illustrates an example of the matcher 830 used in the resonator 800 illustrated in FIG. 8, and FIG. 14B illustrates an example of the matcher 930 used in the resonator 900 illustrated in FIG. 9.

FIG. 14A illustrates a portion of the resonator 800 of FIG. 8 including the matcher 830, and FIG. 14B illustrates a portion of the resonator 900 of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include one or more of the following: a scheme of adjusting the distance h by adaptively activating one of the conductors 831, 832, and 833, a scheme of adjusting the physical location of the conductor 831 up and down, and/or the like.

Referring to FIG. 14B, the matcher 930 may include the conductor 931, a conductor 932, a conductor 933 and conductors 941 and 942. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 illustrated in FIG. 14A, in the matcher 930, the distance h between the conductor 931 and the ground conducting portion 913 may be adjusted using a variety of schemes. For example, the variety of schemes may include one or more of the following: a scheme of adjusting the distance h by adaptively activating one of the conductors 931, 932, and 933, a scheme of adjusting the physical location of the conductor 931 up and down, and the like.

In some implementations, the matcher may include an active element. Thus, a scheme of adjusting an impedance of a resonator using the active element may be similar to the examples described above. For example, the impedance of the resonator may be adjusted by changing a path of current flowing through the matcher using the active element.

Figure 15:
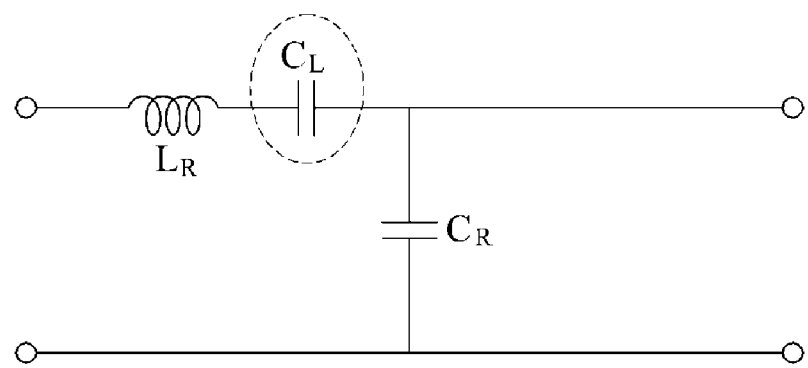
FIG. 15 is a diagram illustrating one equivalent circuit of the resonator of FIG. 8.

FIG. 15 illustrates one equivalent circuit of the resonator 800 of FIG. 8.

The resonator 800 of FIG. 8 used in a wireless power transmission may be modeled to the equivalent circuit of FIG. 15. In the equivalent circuit depicted in FIG. 15, $L_R$ denotes an inductance of the power transmission line, $C_L$ denotes the capacitor 820 that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \qquad \text{[Equation 1]}$$

In Equation 1, MZR denotes a Mu zero resonator.

Referring to Equation 1, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
    a power generator configured to generate a first power for a resonance impedance tracking or a resonance frequency tracking, and a second power for charging target devices;
    a source resonator configured to transmit the first power to a target resonator;
    a communication unit configured to receive, from a wireless power receiver, information on an amount of a received power according to transmission of the first power; and
    a controller configured to detect a mismatching between the target resonator and the source resonator, based on an amount of the first power, and the received information, and to adjust a resonance frequency, or an impedance of a repeater resonator when the mismatching is detected, the repeater resonator being used to perform an impedance matching between the target resonator and the source resonator, and
    wherein the source resonator is further configured to transmit the second power to the target resonator based on the adjusted resonance frequency, or the adjusted impedance of the repeater resonator.

2. The wireless power transmitter of claim 1, wherein, when a ratio of the amount of the first power and the amount of the received power is less than a predetermined reference value, the controller determines that the mismatching is detected.

3. A method of controlling a resonance frequency of a wireless power transmission system, the method comprising:
    generating a first power for a resonance frequency tracking and a second power for charging target devices;
    transmitting the first power to a target resonator;
    receiving, from a wireless power receiver, information on an amount of received power;
    detecting a mismatching between the target resonator and a source resonator, based on an amount of the first power and the received information;
    adjusting the resonance frequency based on the mismatching; and
    transmitting the second power to the target resonator, based on the adjusted resonance frequency.

4. The method of claim 3, wherein the detecting comprises determining that the mismatching is detected, when a ratio of the amount of the first power and the amount of the received power is less than a predetermined reference value.

5. The method of claim 3, wherein the adjusting comprises adjusting the resonance frequency to one or more of a plurality of candidate resonance frequencies in sequence, and tracking a candidate resonance frequency where the mismatching is not detected among the plurality of candidate resonance frequencies.

6. A method of controlling a resonance impedance of a wireless power transmission system, the method comprising:
    generating a first power for a resonance impedance tracking and a second power for charging target devices;
    transmitting the first power to a target resonator;
    receiving, from a wireless power receiver, information on an amount of a received power;
    detecting a mismatching between the target resonator and a source resonator, based on an amount of the first power and the received information;
    adjusting an impedance of a repeater resonator based on the mismatching; and
    transmitting the second power to the target resonator, via the repeater resonator having the adjusted impedance,
    wherein the repeater resonator being used to perform an impedance matching between the target resonator and the source resonator.

7. The method of claim 6, wherein the detecting comprises determining that the mismatching is detected, when a ratio of the amount of the first power and the amount of the received power according to transmission of the first power is less than a predetermined reference value.

8. The method of claim 6, wherein the adjusting comprises adjusting the impedance of the repeater resonator to one or more of a plurality of candidate impedances in sequence, and tracking a candidate impedance where the mismatching is not detected among the plurality of candidate impedances.

9. The wireless power transmitter of claim 1, further comprising:
    the repeater resonator positioned between the source resonator and the target resonator.

10. The wireless power transmitter of claim 9, wherein the repeater resonator increases a range of the magnetic coupling formed between the source resonator and the target resonator.

11. The wireless poer transmitter of claim 9, wherein the repeater resonator performs the impedance matching between the target resonator and the source resonator.

12. The wireless power transmitter of claim 9, wherein the repeater resonator in installed inside or outside the wireless power transmitler.

13. The wireless power transmitter of claim 9, wherein the repeater resonator comprises an impedance adjusting unit for the impedance matching between the target resonator and the source resonator.

* * * * *